Feb. 20, 1934.  H. B. WALSH  1,947,686
APPARATUS FOR TEACHING MUSIC
Filed March 28, 1933    5 Sheets-Sheet 1

INVENTOR.
Hazel B. Walsh
BY Samuel H. Davis
ATTORNEY.

Feb. 20, 1934.   H. B. WALSH   1,947,686
APPARATUS FOR TEACHING MUSIC
Filed March 28, 1933   5 Sheets-Sheet 2

Fig. 2

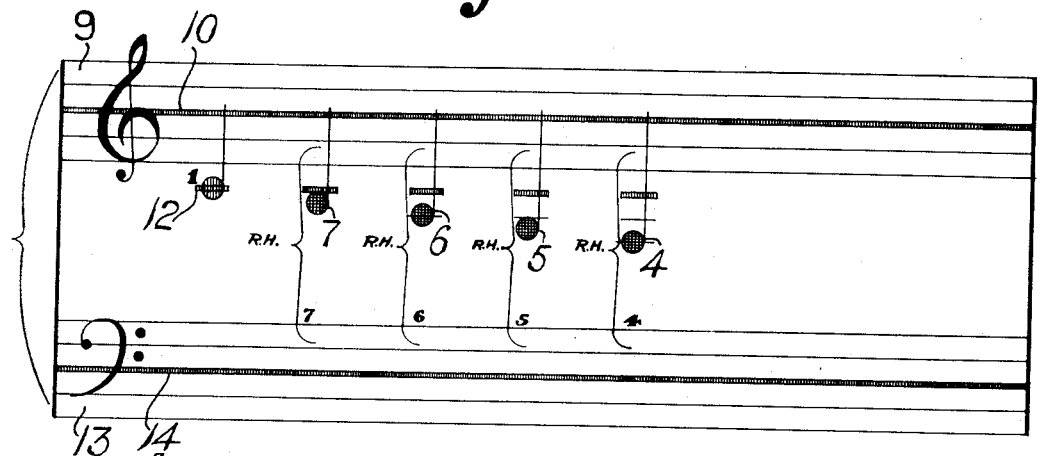

All the above notes are written in the Treble Clef and are to be played with the Right Hand although they are in the First Octave below Middle C.

Fig. 3

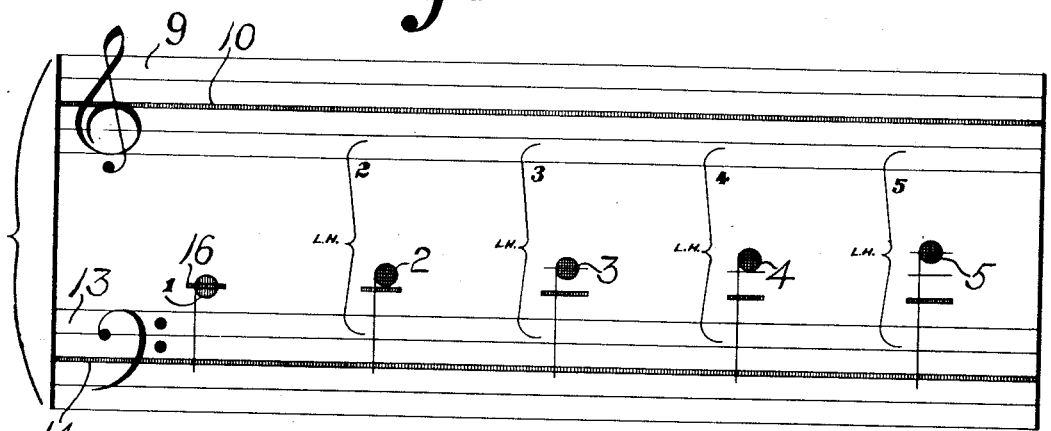

All the above notes are written in the Bass Clef and are to be played with the Left Hand although they are in the First Octave above Middle C.

Fig. 4

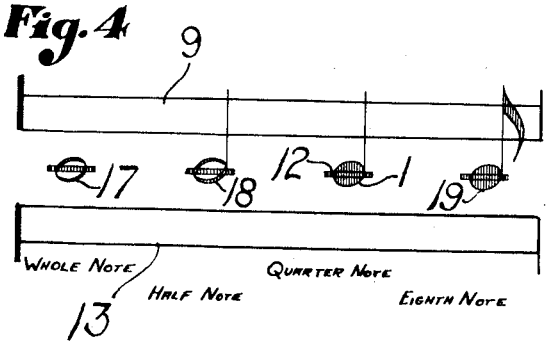

Whole Note   Half Note   Quarter Note   Eighth Note

INVENTOR.
Hazel B. Walsh
BY Samuel H. Davis
ATTORNEY.

Feb. 20, 1934.     H. B. WALSH     1,947,686
APPARATUS FOR TEACHING MUSIC
Filed March 28, 1933     5 Sheets-Sheet 3

INVENTOR.
HAZEL B. WALSH
BY
Samuel H. Davis
ATTORNEY.

Feb. 20, 1934.  H. B. WALSH  1,947,686
APPARATUS FOR TEACHING MUSIC
Filed March 28, 1933  5 Sheets-Sheet 4
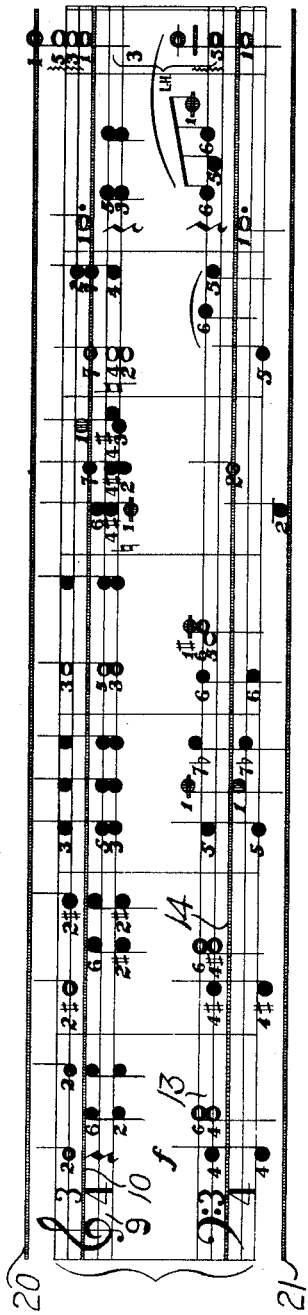
Fig.6
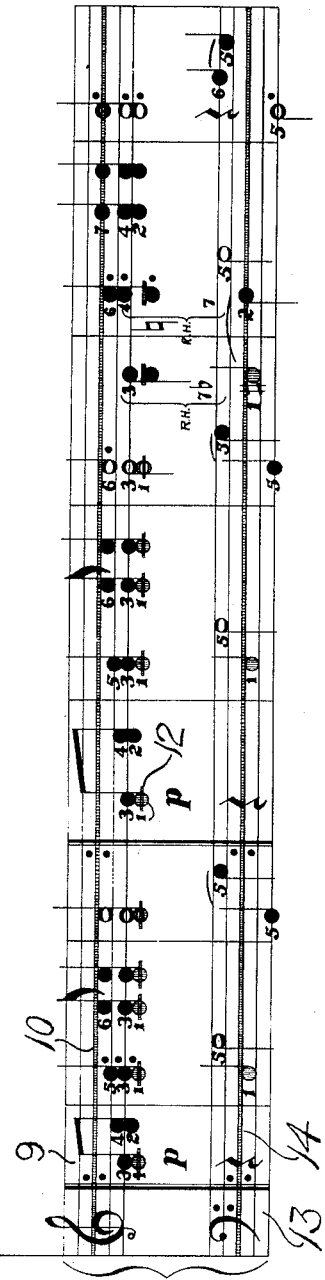
Fig.7
INVENTOR.
HAZEL B. WALSH
BY
Samuel H. Davis
ATTORNEY.

Patented Feb. 20, 1934

1,947,686

UNITED STATES PATENT OFFICE 1,947,686

APPARATUS FOR TEACHING MUSIC

Hazel B. Walsh, Lansing, Mich.

Application March 28, 1933. Serial No. 663,189

4 Claims. (Cl. 84—471)

This invention relates to a method for teaching and rewriting music, and to the means for carrying out the method. It is intended more particularly to aid beginners who seek to learn to play the piano, piano accordion, or like keyed instrument, and its object is to re-write or indicate printed music in such manner that a child able to count may readily read the notes and as easily determine the position of the note upon the keyboard and determine by which hand such notes are to be sounded.

By means of the accompanying drawings the method is made clear and the means employed are illustrated. Of the drawings Fig. 1 represents a top view of a piano keyboard in diagrammatic relation to treble and base staffs with notes and note lines thereon in accordance with this invention.

Fig. 2 shows the treble and base staffs with note lines and note positions and characters below the treble staff.

Fig. 3 shows the treble and base staffs with note lines and note positions and characters above the base staff.

Fig. 4 shows portions of the treble and base staffs with note lines, characters and positions representing whole notes, half note, quarter note and eighth note having the same color as the colored lines of the staffs and showing the notes on the lines.

Fig. 6 shows the accompaniment to a song piece, with the added colored lines above the treble staff and below the base staff continuous and parallel to the like colored lines in the staves.

Fig. 7 shows the accompaniment and an additional staff bearing the notes of a song indicated in accordance with this invention.

Throughout the description and drawings the same number is used to refer to the same part.

Figure 1:
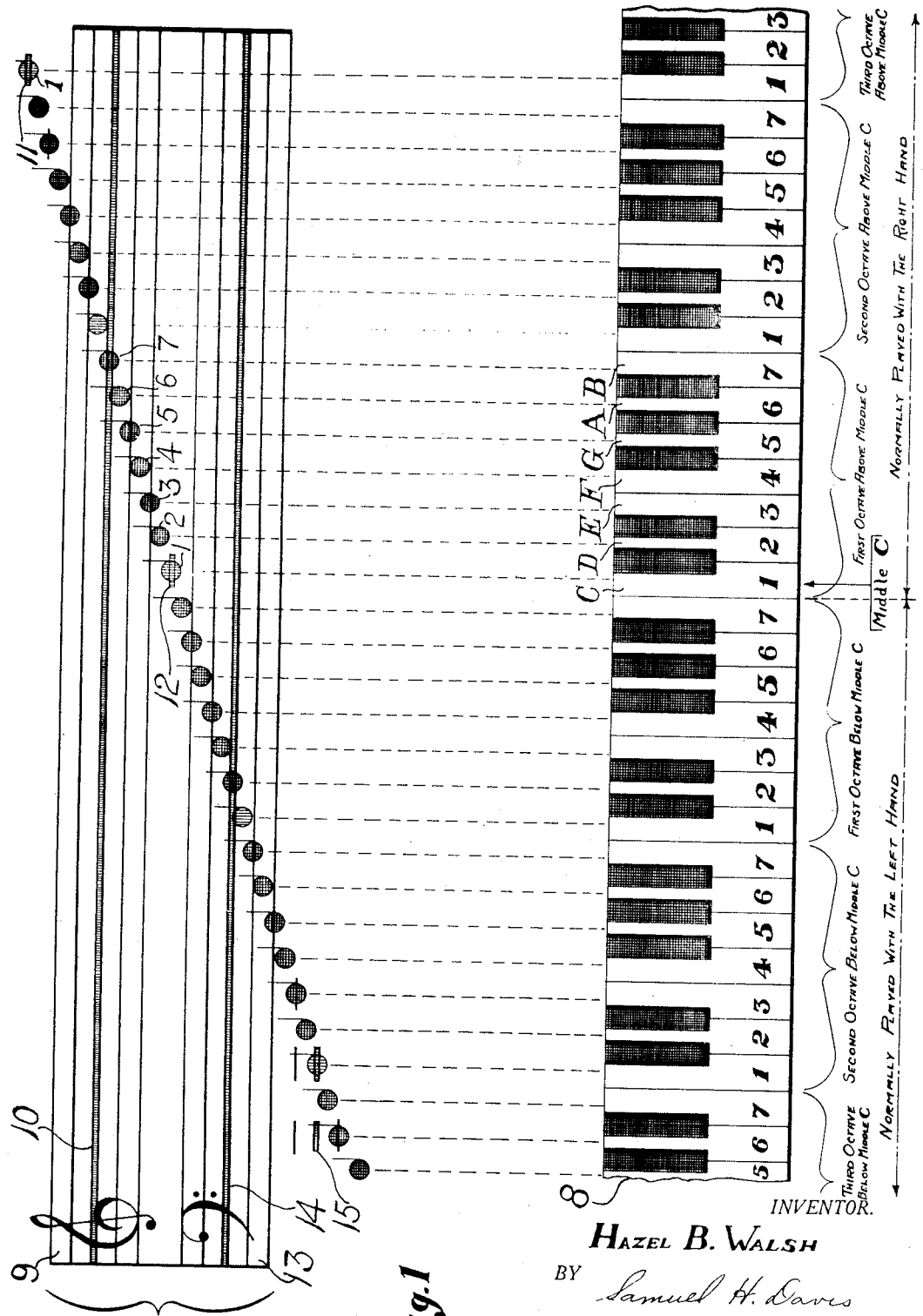
Figure 5:
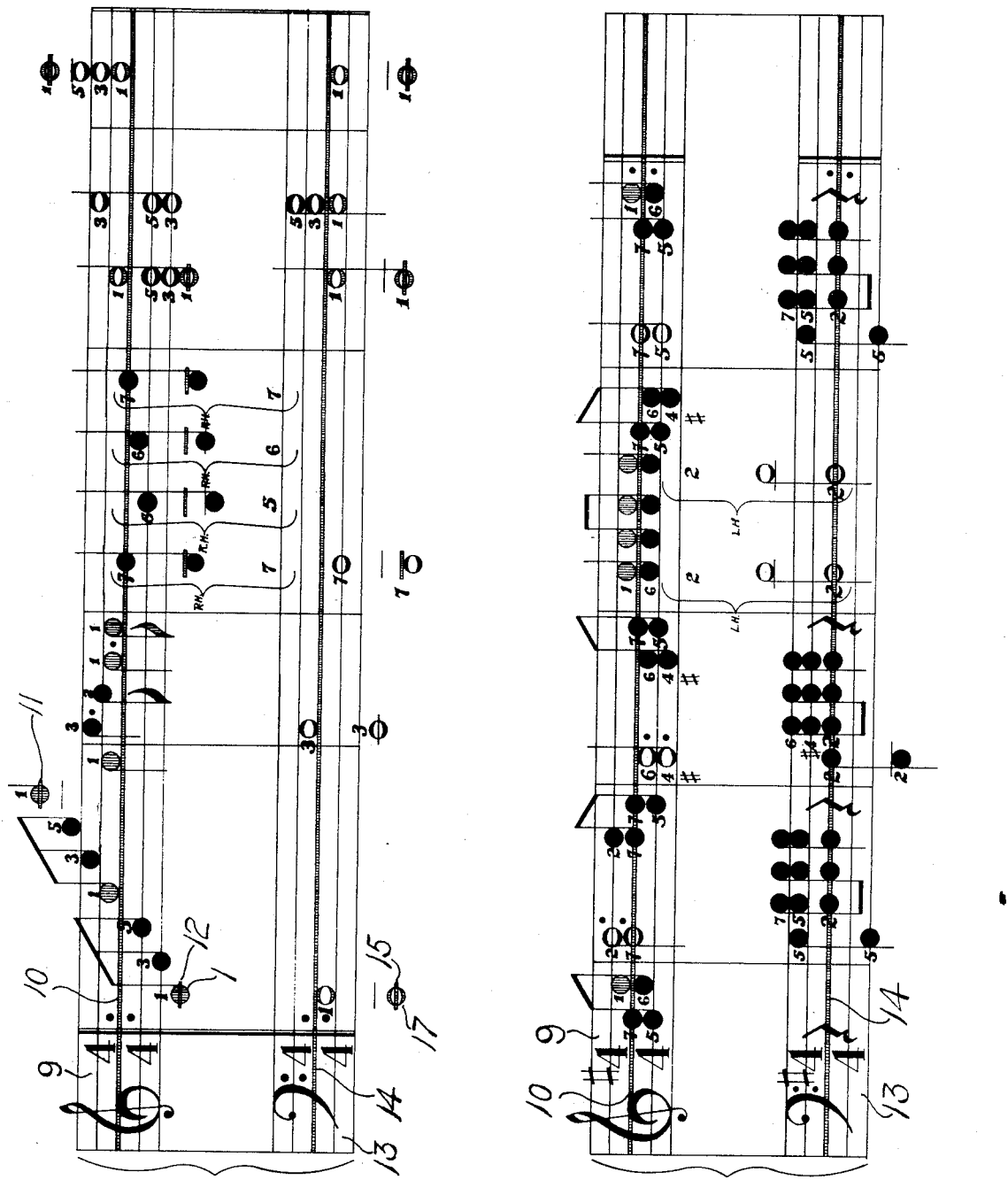
Fig. 5 shows a piece of music with the musical staffs provided with colored lines, note characters, and identifying numbers.

Considering the drawings, the notes of the musical scale, C, D, E, F, G, A, B, are indicated by a series of numerals 1, 2, 3, 4, 5, 6 and 7. In Fig. 1 the keyboard is marked 8.

The treble staff 9 has thereon a median red line 10 extending lengthwise. Above the staff the red lines usually short are designated by number 11, and below the staff by 12.

The base staff 13 has the red line 14 thereon as illustrated in Fig. 3. The first red line 15 is located after the second space below staff 13, and the red line 16 is located above the base staff 13 where it indicates that the note is to be sounded by the left hand. In other words, when the red line 16 and its contiguous note character and number appear above the staff 13 on a sheet of music, the student understands the note is to be struck by a finger of the left hand.

In Fig. 4 are illustrated whole note 1(C), or the same as a half note, quarter note or eighth note, each colored red the same as the line upon or next to which the notes are located on the printed sheet of music. The whole note has the reference number 17 for the purpose of this description, the half note is 18, the quarter note 1, and the eighth note 19, as will be observed.

In Fig. 6 the red line lengthwise above the treble staff is designated 20 and it is continuous instead of being a short line as shown in other figures. In this Fig. 6 also is shown a continuous red line 21 below the base staff.

In Fig. 7 the additional staff 22 with the red line 23 may carry the notes of a song for the guidance of a vocalist.

Figure 8:
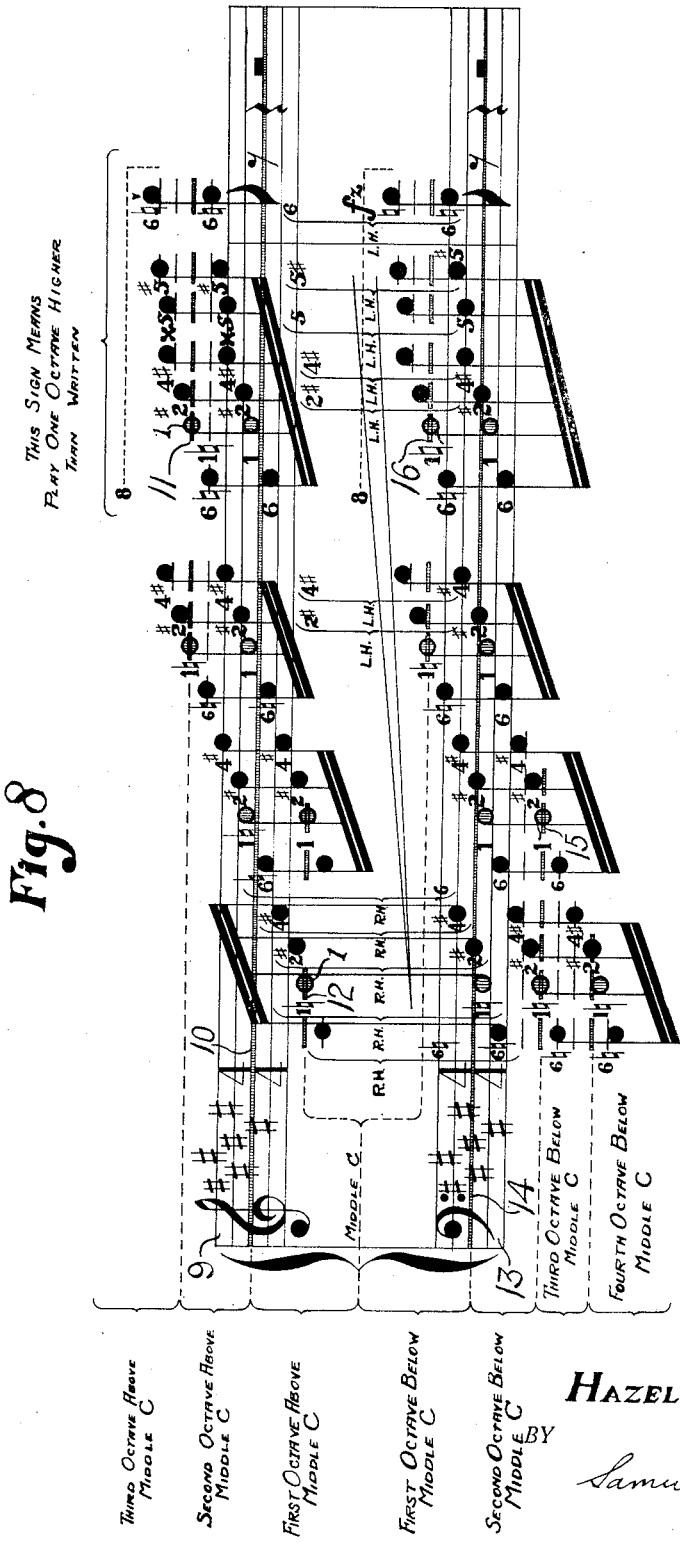
Fig. 8 shows a more complicated piece of concert music with notes re-written and indicated by the series of numbers in accordance with this invention.

The application of this invention is not confined to the simple exercises for young students of music, but may be used equally well in rewriting more complicated pieces such as the concert music illustrated in Fig. 8.

In the operation of this invention, the student who is already familiar with numbers, learns the notes by numbers as well as by letters, but being accustomed to the use of numbers it is easier for him or her to quickly see the particular note on the music sheet, and to understand from its position whether it is to be sounded by the right hand or the left hand, and in which octave the note is located. It will be understood that the note C, represented by numeral 1 located contiguous to the median red line 10 of staff 9, is the middle C of the piano keyboard, and even the youngest child old enough to be acquainted with numbers will understand that other notes C indicated by numeral 1 when shown above or below the staff are in correspondingly higher or lower octaves. It is found that very little personal explanation is usually sufficient to give the learner a clear appreciation of this invention.

Having now described this invention and the manner of its use, I claim:—

1. Means for teaching music, comprising printed treble and base staves each having one of its longitudinal lines colored, note characters on the staves, a series of numbers in numerical order each number representing a note of the musical scale, and said series of numbers arranged to begin contiguously with said colored lines.

2. Means for teaching music, comprising printed musical staves each having a middle longitudinal line colored, note characters on the staves, a series of numbers in numerical order each number representing a note of the musical scale, and said series of numbers arranged to begin contiguously with said colored line.

3. Means for teaching music, comprising printed musical staves, each of said staves having one of its longitudinal lines colored, a series of numbers in numerical order each number representing a note of the musical scale, printed musical notes corresponding to the said numbers, one of said notes being on the line and of the same color as said line.

4. Means for teaching music, comprising printed musical staves, each of said staves having its middle longitudinal line colored, a series of numbers in numerical order each number representing a note of the musical scale, printed musical notes corresponding to the said numbers, one of said notes being of the same color as said line.

HAZEL B. WALSH.